US007183361B2

(12) United States Patent
Toman

(10) Patent No.: US 7,183,361 B2
(45) Date of Patent: Feb. 27, 2007

(54) RHEOLOGY MODIFYING AGENTS AND METHODS OF USING THE SAME

(75) Inventor: Alan Toman, Apex, NC (US)

(73) Assignee: Reichhold, Inc., RTP, NC (US)

( * ) Notice: Subject to any disclaimer, the term of this patent is extended or adjusted under 35 U.S.C. 154(b) by 98 days.

(21) Appl. No.: 10/952,636

(22) Filed: Sep. 29, 2004

(65) Prior Publication Data

US 2005/0069799 A1 Mar. 31, 2005

Related U.S. Application Data

(60) Provisional application No. 60/506,981, filed on Sep. 29, 2003.

(51) Int. Cl.
*C08F 20/62* (2006.01)

(52) U.S. Cl. ....................................... 525/437; 525/438

(58) Field of Classification Search ................ 525/437, 525/438

See application file for complete search history.

(56) References Cited

U.S. PATENT DOCUMENTS 5,089,547 A 2/1992 McCabe et al.
5,241,019 A 8/1993 Otsuki et al.
5,418,301 A * 5/1995 Hult et al. .................. 525/437
5,462,829 A 10/1995 Tyagi et al.
5,780,195 A 7/1998 Nava
6,114,489 A 9/2000 Vicari et al.
6,238,836 B1 5/2001 Nakamura et al.
6,258,896 B1 7/2001 Abuelyaman et al.
6,444,758 B2 9/2002 McNamara et al.

FOREIGN PATENT DOCUMENTS

JP 07-219272 8/1995

OTHER PUBLICATIONS

Notification of Transmittal of the International Search Report and The Written Opinion of the International Searching Authority, or the Declaration, corresponding to PCT/US2004/31849, mailed Mar. 23, 2006.

* cited by examiner

*Primary Examiner*—Kriellion Sanders
(74) *Attorney, Agent, or Firm*—Myers Bigel Sibley & Sajovec, PA

(57) ABSTRACT

The present invention provides, rheology modifying agents that include crystalline polymers wherein crystallinity is provided by a linear long chain aliphatic carboxylic acid on a base polymer. Such crystalline polymers can either have a hyperbranched or dendritic structure or have a comb-like structure.

8 Claims, 9 Drawing Sheets

Avrami equation:

$X(t) = 1 - \exp(-kt^n)$

<u>10 % blend, 25 °C</u>
n = 0.14
k = 0.55 $sec^{-n}$ 30 s = 0.59
60 s = 0.63

Region A: Melt transition of crystalline hyperbranched polyester
Region B: Glass transition of amorphous toner polyester

RHEOLOGY MODIFYING AGENTS AND METHODS OF USING THE SAME

CROSS-REFERENCE TO RELATED APPLICATIONS

This application claims the benefit of, and incorporates herein by reference in its entirety, the following United States Provisional Application: U.S. Provisional Application No. 60/506,981, filed Sep. 29, 2003.

FIELD OF THE INVENTION

This invention relates to rheology modifying agents, and particularly rheology modifying agents for toner applications.

BACKGROUND OF THE INVENTION

Electrophotographic processes involve the transfer of an ink or toner image to a recording medium where the image is fixed. In typical electrophotographic processes, an electrostatic latent image is developed with toner and transferred to a recording medium, such as paper. The transferred toner image is fixed to the recording medium using known processes, such as by heating or fusing. Fixation of a toner image by heating typically involves the passing of a sheet of paper or other substrate containing toner particles through one or more fusing rollers. The heat applied by the fusing roller to the toner particles on the paper fixes the toner to the paper. The fixing of toner to paper or other substrates is well known.

One of the problems associated with the fixing of toner is the undesirable transfer of toner to the fusing roller during the fixing process. This undesirable transfer is sometimes referred to as "off setting" and involves the transfer of toner from the substrate to the fusing roller. The transfer of toner to the fusing roller contaminates the fusing roller, which results in the unwanted transfer of toner from the fusing roller onto subsequent substrates passing by the fusing roller. This transfer tends to produce ghost images or unwanted toner marks on subsequent substrates.

The off setting of toner to the fusing roller may be caused by a number of different factors. In some instances, toner is transferred to a fusing roller due to the cold offset or fixing temperature of the toner. The cold offset temperature is the temperature at which the toner begins to be fused. Typically, toners having lower viscosities have lower cold offset temperatures. In other instances, toner is transferred to the fusing roller because the toner loses its cohesive strength, producing a melted mass of toner that sticks to the fusing roller. The temperature at which this phenomenon occurs is known as the hot offset point or temperature. The hot offset temperature is related to the melt elasticity of the toner. Toners having lower melt elasticities exhibit lower hot offset temperatures whereas toners with higher melt elasticities have higher hot offset temperatures.

The difference between the hot offset temperature and the cold offset temperature is sometimes called the offset latitude, or a temperature range within which a fusing roller must operate in order to prevent off setting. In many toner fixing applications, the larger the offset latitude of the toner the better because a larger offset latitude provides a greater operational temperature range for the fusing rollers. Furthermore, a reduction in the cold offset temperature allows a decrease in the operational temperature of the fusing roller, which decreases the temperature in an elctrophotographic apparatus, prolonging its life.

It is therefore desirable to develop toner compositions having greater offset latitudes. This can be accomplished by developing toner compositions having lower cold offset temperatures and higher hot offset temperatures.

SUMMARY OF THE INVENTION

The present invention relates to rheology modification resins or polymers that may be added to various resin compositions used in eletrophotographic and printing processes.

According to embodiments of the present invention, rheology modifying agents include crystalline polymers wherein crystallinity is provided by a linear long chain aliphatic carboxylic acid on a base polymer. Such crystalline polymers can either have hyperbranched or dendritic structures or have comb-like structures.

In one embodiment, the base polymer comprises a branching monomer having a total functionality of three or more and an initiator monomer having at least two hydroxyl groups. The linear long chain aliphatic carboxylic acid is reacted with the initiator monomer to provide a crystalline polymer having a hyperbranched or dendritic structure. In another embodiment, the base polymer is a backbone monomer having multiple (more than one) pendant epoxy groups, e.g., an epoxy creosol novolac resin. The backbone monomer is reacted with the linear long chain aliphatic carboxylic acid to provide a crystalline polymer having a comb-like structure or comb-like branching.

Such hyperbranched or comb-like crystalline polymeric rheology modifying agents are added to resin compositions (e.g., toner resins) used in electrophotographic and printing processes to alter the rheology of the particular resin compositions.

BRIEF DESCRIPTION OF THE DRAWING FIGURES

The invention can be more readily ascertained from the following description of the invention when read in conjunction with the accompanying drawings in which.

DETAILED DESCRIPTION OF THE INVENTION

Figure 1:
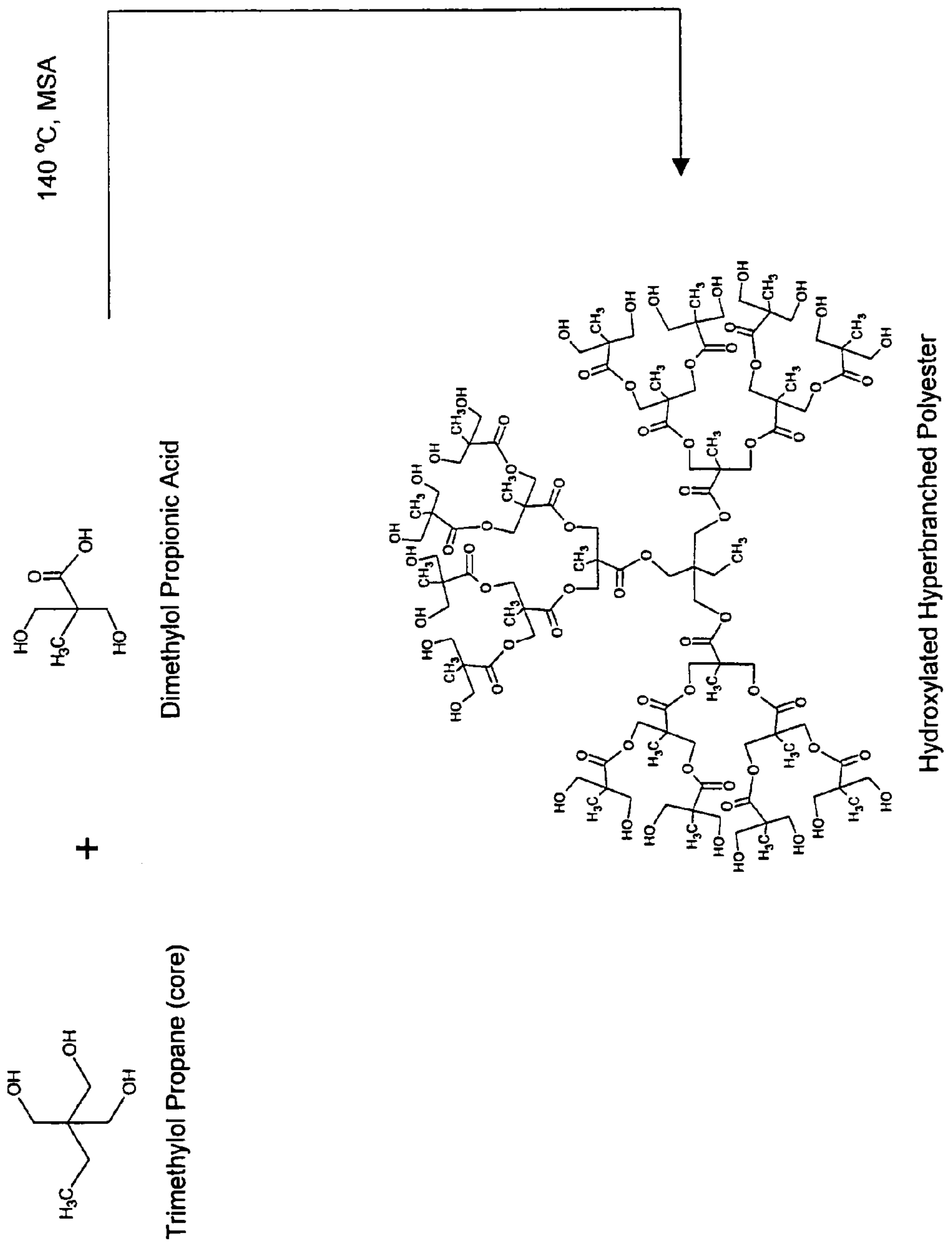
FIG. 1 illustrates an exemplary reaction for producing a hyperbranched polyester.

The present invention now will be described more fully hereinafter with reference to the accompanying drawings. This invention may be embodied in many different forms and should not be construed as limited to the embodiments set forth herein; rather, these embodiments are provided so that this disclosure will be thorough and complete, and will fully convey the scope of the invention to those skilled in the art.

The offset properties of toner compositions have been found to depend on the rheology properties of the toner composition. For instance, the fixing temperature, or cold offset temperature, of a toner composition is related to the complex viscosity of the toner composition. A decrease in the viscosity of a toner composition results in a decrease in the cold offset temperature of the toner composition. Similarly, the hot offset temperature is related to the melt elasticity or storage modulus of a toner composition. An increase in the melt elasticity corresponds to an increase in the hot offset temperature. The modification of the rheology properties of a toner composition can therefore alter the temperatures at which offsetting will occur with the toner composition.

Embodiments of the present invention involve agents for modifying the rheology of resin compositions used in electrophotographic or printing processes, e.g., resins for toner, ink jet print, phase change inks, offset lithography, gravure, screen printing, flexography and paper-like displays. The rheology modifying agents include polymers and/or resins that may be added to resin compositions to modify the rheology of the resin composition. For example, a rheology modifying agent according to embodiments of the present invention may be added to a toner composition to alter the viscosity and/or melt elasticity of the toner composition.

Rheology modifying agents according to some embodiments of the present invention may be blended with resins, such as toner resins, to form a resin composition. The addition of the rheology modifying agent may increase the offset latitude of the resin. According to some embodiments of the present invention, the rheology modifying agents increase the offset latitude of the resin composition by decreasing the cold offset temperature of the resin composition. The addition of a rheology modifying agent of the present invention to a toner resin can lower the viscosity of the resin composition required during fusing, thereby decreasing the cold offset temperature of the resin composition.

Rheology modifying agents according to other embodiments of the present invention may be used to alter the melt elasticity of a resin composition. For instance, a rheology modifying agent may be added to a toner resin composition to increase the melt elasticity of the resin composition, thereby increasing the hot offset temperature of the resin composition. In some instances, the addition of a melt elasticity modifying agent may also alter the viscosity of the resin composition, while in other instances, the rheology modifying agent will not alter the viscosity or provide a minimal viscosity increase.

According to other embodiments of the present invention, a rheology modifying agent can be adapted to both increase the melt elasticity of a toner resin composition and decrease the viscosity of the toner resin composition. The addition of such a rheology modifying agent broadens the offset latitude of the resin composition to which it is added.

In general, the rheology modifying agents are crystalline polymers wherein crystallinity is provided by a linear long chain aliphatic carboxylic acid on a base polymer. Specifically, in one embodiment, the crystalline rheology modifying agent is provided by a branching monomer having a total functionality of at least three or more, an initiator monomer on the branching monomer and having at least two hydroxyl groups, and the linear long chain aliphatic carboxylic acid reactive with the initiator monomer. Exemplary branching monomers include dimethylolpropionic acid, dimethylolbutanoic acid, glycidol, 4,4-bis (oxiranylmethoxyphenyl) valeric acid and 4,4-bis (4'-hydroxyphenyl) pentanoic acid.

Exemplary initiator monomers having at least two hydroxyl groups include methoxy polyethylene glycol, polyethylene glycol, trimethyolpropane, ethoxylated trimethyolpropane, trifunctional polyethylene glycol, tris-hydroxyethyl isocyanurate, ethoxylated pentaerythritol, styrene-allyl alcohol polymers, and bisphenol/epichlorohydric oligomers and mixtures thereof.

Hyperbranched polymers include polymers having branching structures that are produced by a sequence of step-growth or addition polymerization reactions. Dendritic polymers include polymers having identical branching structures. The formation or synthesis of hyperbranched and dendritic polymers may be accomplished by known methods, for example, by esterification, amidation, free radical polymerization, or ionic polymerization methods. Any number of branches may be created in the hyperbranched or dendritic polymers used with the invention, although between about 10 and about 20 branches are preferred for some embodiments of the present invention.

Moreover by selection of the carboxylic acid the rheology modifying agent can be a solid at room temperature.

Examples of linear long chain aliphatic carboxylic acid that may be used with embodiments of the present invention include those listed in Table 1.

TABLE 1

| Number of Carbons | Name | Common Name | Melt Point (° C.) |
|---|---|---|---|
| 14 | Tetradecanoic | Myristic | 54 |
| 15 | Pentadecanoic | | 51 |
| 16 | Hexadecanoic | Palmitic | 63 |
| 17 | Heptadecanoic | Margaric | 59 |
| 18 | Octadecanoic | Stearic | 70 |
| 19 | Nonadecanoic | | 68 |
| 20 | Eicosanoic | Arachidic | 75 |
| 21 | Heneicosanoic | | 74 |
| 22 | Docosanoic | Behenic | 81 |
| 23 | Tricosanoic | | 79 |
| 24 | Tetracosanoic | Lignoceric | 78 |
| 25 | Pentacosanoic | | |
| 26 | Hexacosanoic | | 88 |
| 27 | Hepacosanoic | | 88 |
| 28 | Octacosanoic | | 93 |

Figure 2:
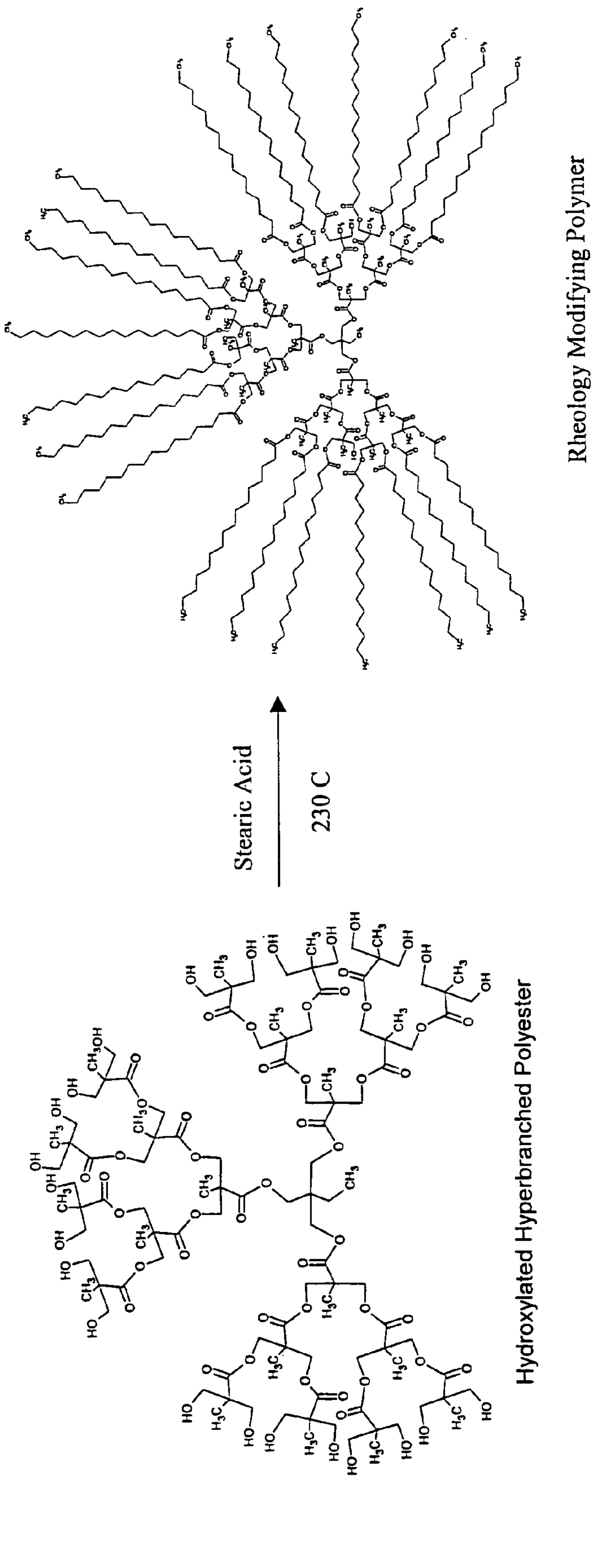
FIG. 2 illustrates an exemplary reaction of a hyperbranched polyester with a linear carbon chain to produce a rheology modifying agent according to embodiments of the present invention.

For example, a core molecule of trimethylol propane is reacted with dimethylol propionic acid to form a hydroxylated hyperbranched polyester. An example of the reaction is illustrated in FIG. 1. The hydroxylated hyperbranched polyester is reacted with stearic acid at about 230° C. as illustrated in FIG. 2. The reaction of the hydroxylated hyperbranched polyester with stearic acid produces a rheology modifying agent according to embodiments of the present invention.

Crystalline rheology modifying agents according to other embodiments of the present invention include crystalline comb-branched polymers. The crystalline comb-branched polymers used as rheology modifying resins include polymer backbones having comb-like branches or side chains. In some embodiments, the branches or side chains are formed from fatty acids, such as stearic acid, or other linear long chain aliphatic carboxylic acids.

The backbone polymers used to form the comb-branched rheology modifying agents of the present invention may be selected from any polymer compatible with toner compositions, and preferably have more than one pendant epoxy group. Exemplary polymer backbones having pendant epoxy groups include, but are not limited to, novolacs. For instance, epoxy novolac resins are known and used in toner compositions as described in U.S. Pat. No. 5,780,195, which is incorporated herein by reference in its entirety. In some embodiments, for example, the polymer backbones can be selected from epoxidized cresol novolacs, epoxidized phenol novolacs, styrene-allyl alcohol, addition polymers containing glycidyl methacrylate and/or allyl glycidyl ether monomer, and mixtures and blends thereof. Polyvinyl alcohol-stearic acids may also be used to form comb-branched rheology modifying agents according to embodiments of the present invention. An epoxy novolac resin may be reacted with a linear carbon chain having an even number of carbon atoms. For example, esterification reactions can be used to attach the long chains. Such reactions involve the reaction of the acid with an oxirane group and with a hydroxyl group. The reaction can be performed with or without a catalyst. Other polymer backbones having reactive repeating units could also be used, for example, polyvinyl alcohol or a (meth)acrylate polymer formed from predominately hydroxyl or glycidyl functional (meth)acrylate monomers. Other examples include glycidyl methacrylate, allyl glycidyl ether, 2-hydroxyethyl acrylate and methacrylate, hydroxypropyl acrylate and methacrylate, allyl alcohol, ethoxylated and propoxylated allyl alcohol, and vinyl alcohol.

Figure 3:
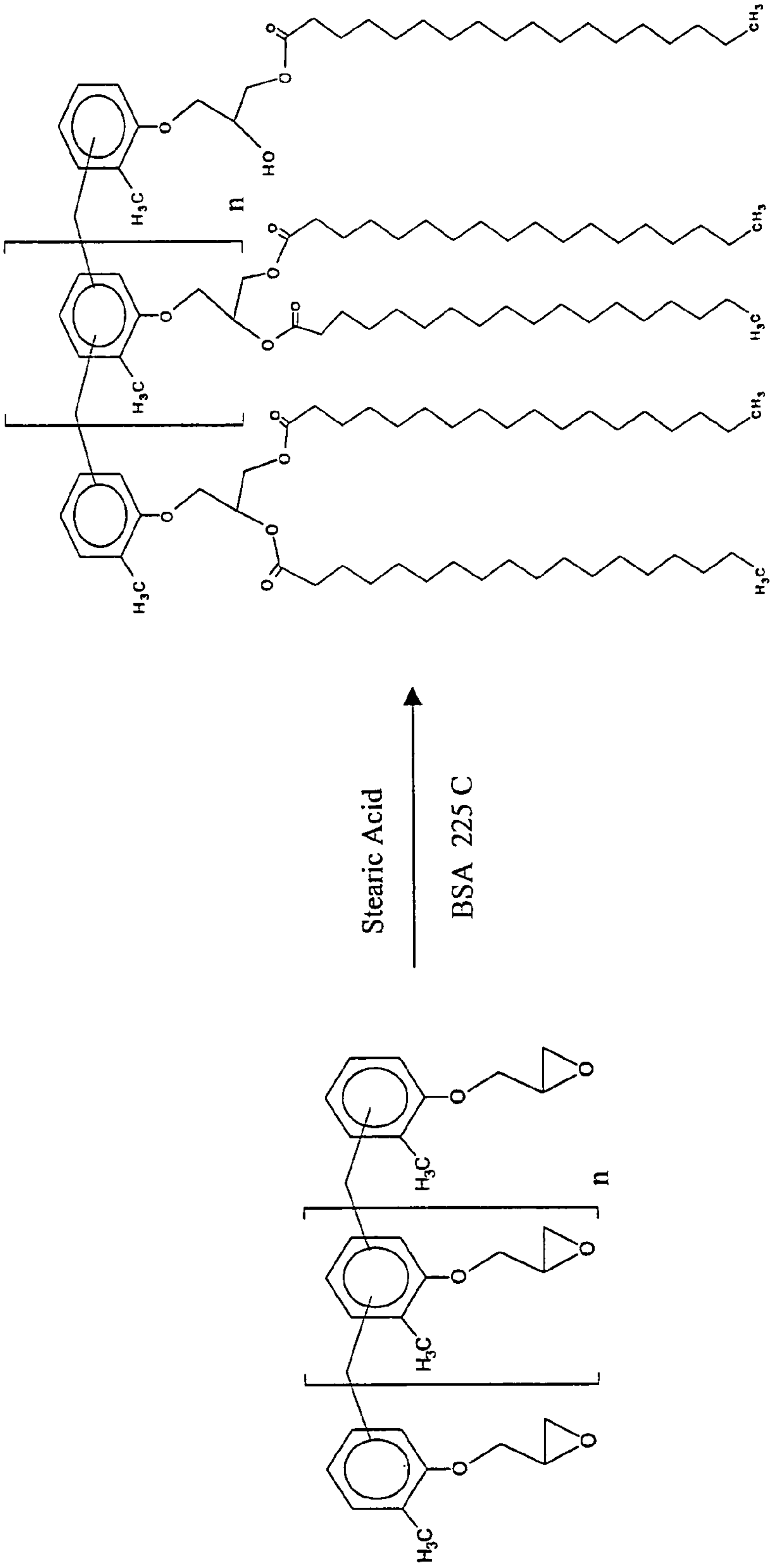
FIG. 3 illustrates an exemplary reaction of an epoxy novolac resin with a linear carbon chain to produce a rheology modifying agent according to embodiments of the present invention.

For example, the reaction of an epoxy novolac resin with stearic acid to form a rheology modifying agent according to embodiments of the present invention is illustrated in FIG. 3. An epoxidized creosol novolac resin, such as Epiclon N-680 manufactured by Dainippon Ink & Chemicals of Japan, can be reacted with stearic acid at a temperature of about 225° C. in the presence of a catalytic amount of butyl stannoic acid (BSA). The reaction forms a rheology modifying agent having an epoxy novolac resin backbone with comb-like branches formed from the stearic acid. Although the Epiclon N-680 is limited to n=4.5, other epoxy novolac resins can be used to form similar structures that may be used as rheology modifying agents according to the present invention. For instance, n may range from about 3 to about 9.

The crystalline rheology modifying agents according to embodiments of the present invention crystallize through the formation of intra-molecular assemblies and are not dependent upon the diffusion rate of the polymer chains. The intra-molecular crystallization mechanism is provided by the high concentration of crystalline moieties existing per linear chain of carbon atoms within the crystalline structures. The presence of the crystalline moieties helps to maintain the physical stability of the crystalline rheology modifying agents. Furthermore, the crystalline rheology modifying agents exhibit low melt viscosities, which correspond to low glass transition temperatures ($T_g$) and melting points. The lower melt viscosities help to improve fixing and decrease the cold offset temperature and properties of a resin composition to which the crystalline rheology modifying agents are added. The crystalline rheology modifying agents also exhibit high storage modulus because of their high molecular weight. This helps to improve the hot offset performance of the crystalline rheology modifying agents and resin compositions to which they are added.

Other embodiments of the present invention include toner resin compositions. Toner resin compositions of the present invention include toner compositions combined with or mixed with rheology modifying agents of the present invention. A typical toner composition comprises a toner resin, a colorant and an electrostatic carrier material. Exemplary toner resins are disclosed in U.S. Pat. Nos. 5,780,195, 5,061,588, 5,089,547 and 5,324,611, the disclosure of which are incorporated by reference in their entirety.

Additional additives known by the skilled artisan may be employed in the toner resin composition of the present invention including, for example, inhibitors, paraffins, lubricants, and shrink-reducing additives. Any of the various suitable percentages of these additives can be used in conjunction with the toner resin composition.

The toner resin composition typically includes a colorant. Exemplary colorants include a red pigment (e.g., red iron oxide, cadmium red, red lead oxide, cadmium, mercury sulfide, permanent red 4R, lithol red, pyrazolone red, watchung red, calcium salt, lake red D, brilliant carmine 6B, eosine lake, rhodamine lake B, alizaline lake, brilliant carmine 3B, or the like); a green pigment (e.g., chrome green, chrome oxide green, pigment green B, malachite green lake, fanal yellow green G, or the like); a blue pigment (e.g., Prussian blue, cobalt blue, alkali blue lake, victoria blue lake, phthalocyanine blue, metal-free phthalocyanine blue, phthalocyanine blue particle chlorine compound, fast sky blue, indanthrene blue BC, or the like); a magenta pigment (e.g., manganese violet, fast violet B, methyl violet lake, or the like); a yellow pigment (e.g., chrome yellow, zinc yellow, cadmium yellow, yellow oxide, mineral fast yellow, nickel titanium yellow, nables yellow, naphthol yellow S, hansa yellow G, hansa yellow 10G, benzidine yellow G, benzidine yellow GR, quinoline yellow lake, permanent yellow, NCG, tartrazine lake, or the like); an orange pigment (e.g., chrome orange, molybdenum orange, permanent orange GTR, indanthrene brilliant orange RK, vulcan orange, pyrazolone orange benzidine orange G, indanthrene brilliant orange GK, or the like); or a black pigment (e.g., carbon black, acetylene black, lamp black, aniline black, or the like). Suitable colorants are also disclosed in U.S. Pat. No. 3,989,648 to Lenhard et al. and U.S. Pat. No. 5,162,187 to Lyons et al., the disclosure of which are incorporated herein by reference in their entirety. Mixtures of any of the colorants may be used. The toner resin composition preferably includes from about 1 to 20 percent by weight of colorant.

The toner resin composition can also include a charge control agent such as Nigrosine Base EX (available from Orient Kagaku K.K.); quaternary ammonium salt (P-51: available from Orient Kagaku K.K.); Nigrosine Bontron N-01 (available from Orient Kagaku K.K.); Sudatiefschwarz BB (Solvent Black 3, C.I. 26150), Fettschwarz HEN (C.I. No. 26150); Brilliantspiritschwarz TN (available from Farben Fabriken Bayer A. G.); Zapanschwarz X (available from Farberke Hechist A. G.); and an alkoxylated amine, alkyl amide, molybdic chelating agent and the like. Mixtures of any of the charge control agents may be used. Preferably, the toner resin composition includes about 1 to 5 weight percent of charge control agent.

The rheology modifying agents of the present invention can improve the performance of toner compositions by increasing the offset latitude of the composition and by improving the rheology properties of the toner composition, which improves the toner quality in high speed fixing systems. In addition, some embodiments of the rheology modifying agents of the present invention do not plasticize, thereby improving toner performance.

Various embodiments of the present invention are illustrated by the following Examples, which are provided for illustrative purposes and are not meant to limit the embodiments of the present invention in any way:

EXAMPLE 1

A hyperbranched rheology modifying agent according to the present invention was formed from trimethylol propane, dimethylolpropionic acid, and stearic acid. A hydroxylated hyperbranched polymer was formed by the esterification reaction of trimethylol propane with dimethylolpropionic acid in the presence of methanesulfonic acid (MSA) at a temperature of about 140° C. The hydroxylated hyperbranched polymer was reacted with stearic acid at a temperature of about 230° C. to form the hyperbranched rheology modifier according to the reaction scheme illustrated in FIG. 2. The hyperbranched rheology modifying agent included about 0.19 weight percent trimethylol propane, about 35.26 weight percent dimethylolpropionic acid, and about 64.55 weight percent stearic acid. For illustrative purposes, the hyperbranched rheology modifying agent is also referred to as RMA1.

Various rheology properties for the RMA1 sample were determined. The onset of melting for the RMA1 sample occurred at 46.4° C., while the peak melting point occurred at 49.8° C. The melting points were measured using a Perkin-Elmer DSC7. The viscosity of the RMA1 sample was measured at 14.4 Poise. The viscosity of the RMA1 sample was measured using a Brookfield CAP 2000 rheometer operating at 60° C. and 500 rpm.

Figure 4:
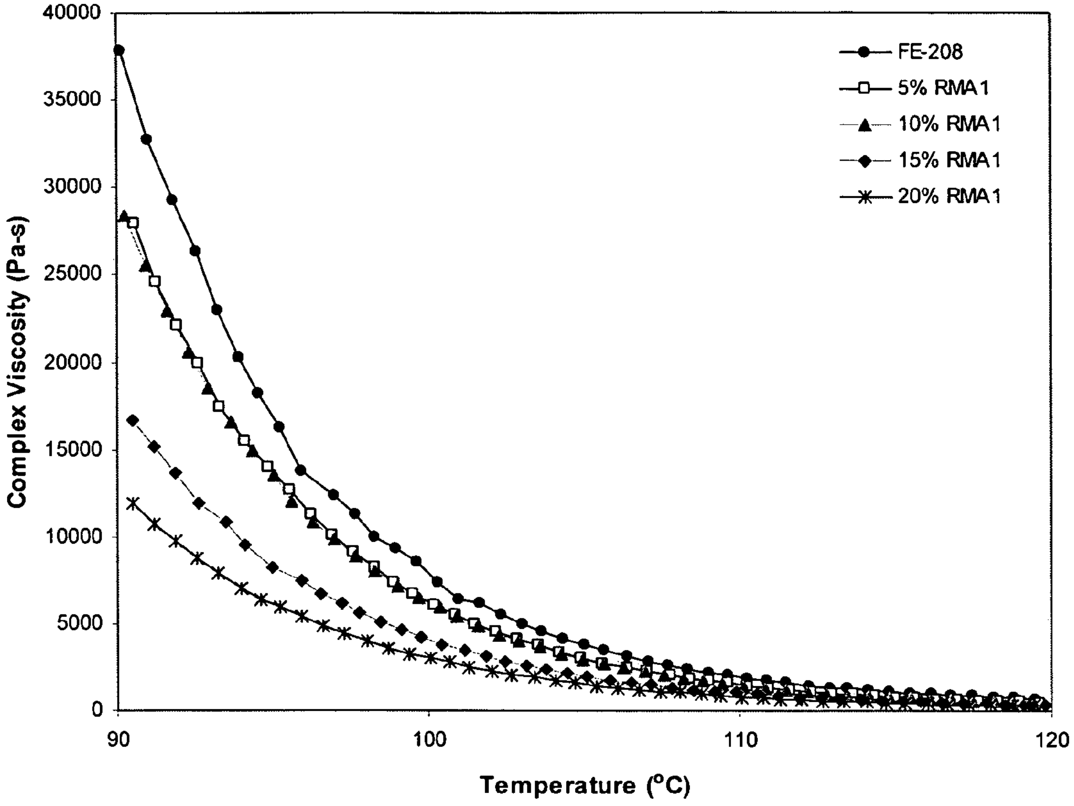
FIG. 4 illustrates a plot of viscosity data for a toner and toner compositions according to embodiments of the present invention.

Toner compositions employing the hyperbranched rheology modifying resin RMA1 were made and tested. Samples of a toner composition (FE-208 produced by Dainippon Ink & Chemicals of Japan) were mixed with various percentages of the RMA1 sample to create toner compositions having 5 percent, 10 percent and 20 percent by weight RMA1. The melt viscosities of the toner composition samples were determined using an ARES dynamic mechanical analyzer manufactured by TA Instruments. The results were plotted and are illustrated in FIG. 4. The viscosities of the toner compositions having 10 percent and 20 percent by weight of RMA1 are lower than the viscosity of the FE-208 toner composition alone.

Figure 5:
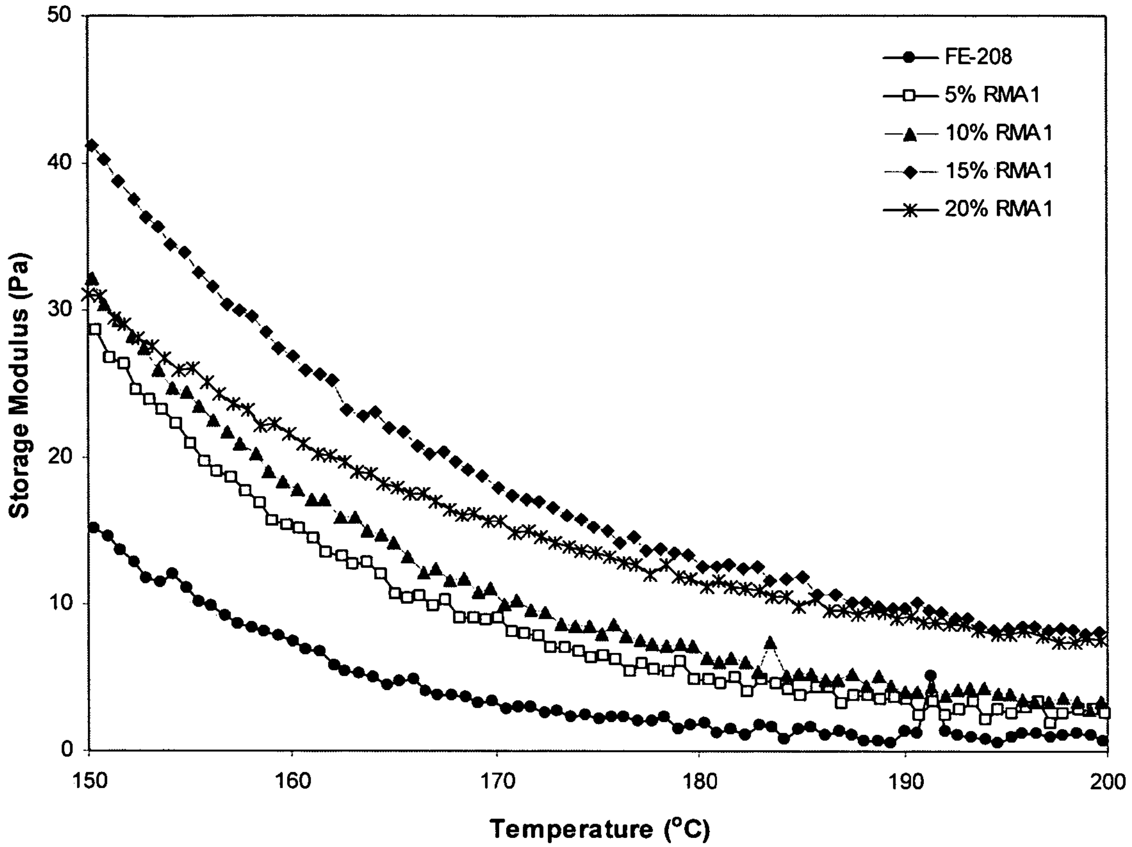
FIG. 5 illustrates a plot of storage modulus data for a toner and toner compositions according to embodiments of the present invention.

The toner compositions employing 5 percent, 10 percent, and 20 percent by weight hyperbranched rheology modifying resin RMA1 in combination with toner FE-208 were also tested to determine the storage modulus value at different temperatures. The results of the tests are plotted in FIG. 5 and compared to the storage modulus values of the FE-208 toner alone. In each instance, the storage modulus values of the toner compositions with RMA1 rheology modifying agents were higher than the corresponding storage modulus value for the FE-208 alone. Therefore, the addition of RMA1 rheology modifying agents to a toner composition, such as toner FE-208, increases the storage modulus of the mixture.

Figure 6:
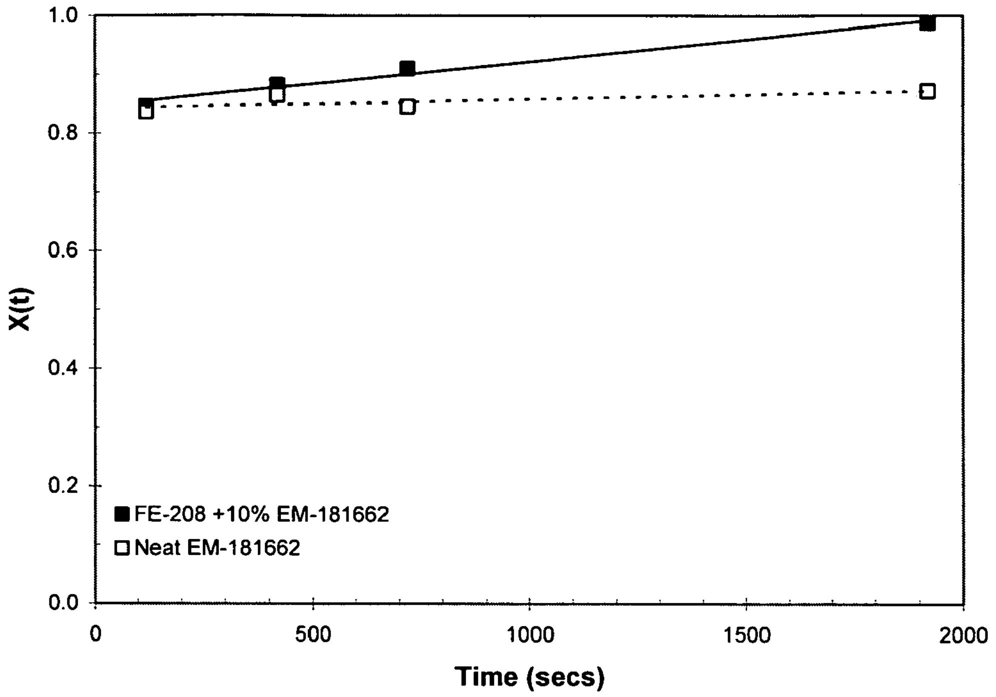
FIG. 6 illustrates a plot of re-crystallization data of rheology modifying agents and toner compositions according to embodiments of the present invention.

The recrystallization behavior of the RMA1 rheology modifying agent alone and in combination with the FE-208 toner at 25° C. was determined and is plotted in FIG. 6. The y-axis in FIG. 6 represents the percentage of crystallization of the compound, which is plotted against time on the x-axis. At a time of 100 seconds, it can be seen that the re-crystallization of a toner composition comprising FE-208 toner and 10 percent by weight of an RMA1 rheology modifying agent is about 84 percent. This represents rapid re-crystallization of the toner composition and indicates that the rheology modifying agent has regained essentially all of its crystallinity within the timeframe of the test.

The toner compositions comprising a mixture of FE-208 toner and RMA1 rheology modifying agents exhibited lower melt viscosities and higher storage modulus values than that of the FE-208 toner alone. The decreased viscosities correspond to lower cold offset temperatures and the increases storage modulus values correspond to higher hot offset temperatures. As a result, the toner compositions including RMA1 rheology modifying agents exhibit a larger offset latitude range. In addition, the toner compositions comprising the FE-208 toner and RMA1 exhibited the same glass transition temperatures ($T_g$) as that of the toner FE-208 alone. Thus, the glass transition temperature of the amorphous polyester FE-208 toner is unaffected by the presence of the crystalline rheology modifying agent RMA1.

EXAMPLE 2

A crystalline comb-like rheology modifying agent according to the present invention was formed from Epiclon N-680 and stearic acid. Epiclon N-680 is an epoxidized creosol-novolac resin produced and sold by Dainippon Ink & Chemicals of Japan. The Epiclon N-680 was reacted with stearic acid in the presence of BSA at a temperature of about 225° C. according to the reaction scheme illustrated in FIG. 3. Initially the epoxy group reacts with stearic acid and generates a hydroxyl group. This hydroxyl group is then esterified with additional stearic acid, resulting in the rheology modifying agent. The crystalline comb-like rheology modifying agent included about 30.62 weight percent Epiclon N-680 and about 69.38 weight percent stearic acid. For illustrative purposes, the crystalline comb-like rheology modifying agent is also referred to as RMA2.

Various rheology properties for the RMA2 sample were determined. The onset of melting for the RMA2 sample occurred at 45.1° C., while the peak melting point occurred at 48.2° C. The melting points were measured using a Perkin-Elmer DSC7. The viscosity of the RMA2 sample was measured at 49.8 Poise. The viscosity of the RMA2 sample was measured using a Brookfield CAP 2000 rheometer operating at 60° C. and 500 rpm.

Figure 7:
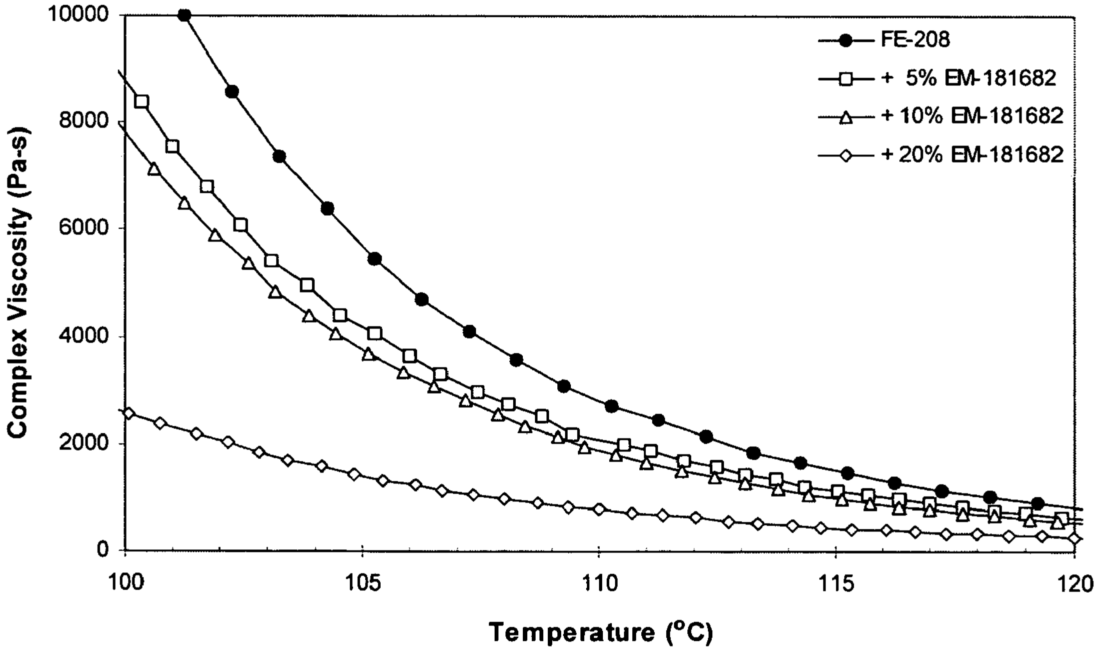
FIG. 7 illustrates a plot of viscosity data for a toner and toner compositions according to embodiments of the present invention.

Toner compositions employing the crystalline comb-like rheology modifying resin RMA2 were made and tested. Samples of a toner composition (FE-208 produced by Dainippon Ink & Chemicals of Japan) were mixed with various percentages of the RMA2 sample to create toner compositions having 5 percent, 10 percent and 20 percent by weight RMA2. The melt viscosities of the toner composition samples were determined and plotted. The results of the melt viscosity tests are illustrated in FIG. 7. The viscosities of the toner compositions having 5 percent, 10 percent, and 20 percent by weight of RMA2 are lower than the viscosity of the FE-208 toner composition alone. Thus, when added to FE-208, the RMA2 rheology modifying agent lowered the viscosity of the toner composition.

Figure 8:
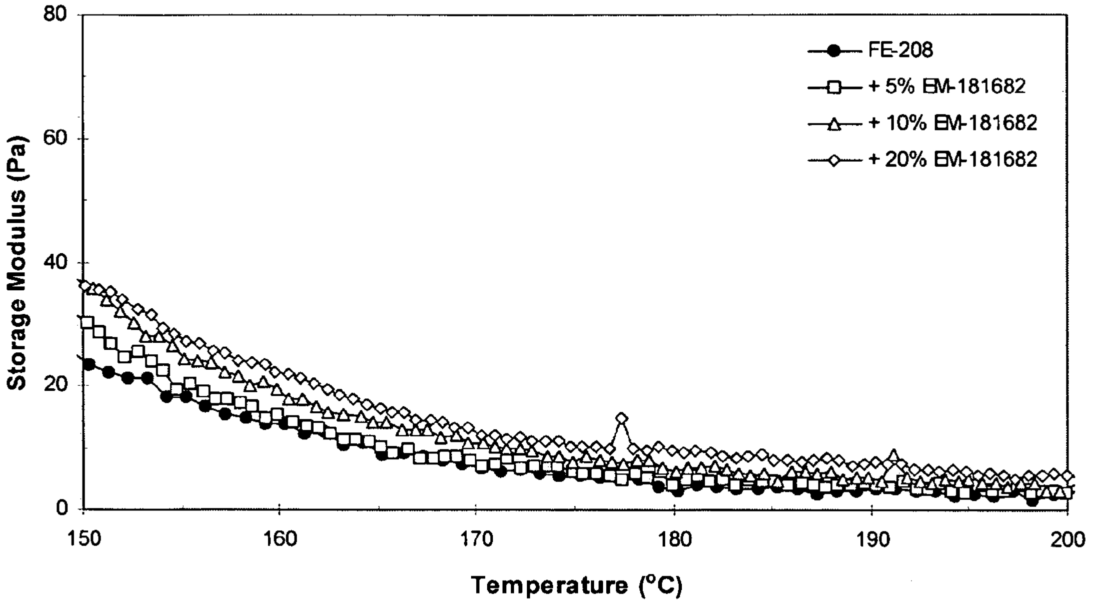
FIG. 8 illustrates a plot of storage modulus data for a toner and toner compositions according to embodiments of the present invention.

The toner compositions employing 5 percent, 10 percent, and 20 percent by weight hyperbranched rheology modifying resin RMA2 in combination with toner FE-208 were also tested to determine the storage modulus value at different temperatures. The results of the tests are plotted in FIG. 8 and compared to the storage modulus values of the FE-208 toner alone. In each instance, the storage modulus values of the toner compositions with RMA2 rheology modifying agents were higher than the corresponding storage modulus value for the FE-208 alone. Therefore, the addition of RMA2 rheology modifying agents to a toner composition, such as toner FE-208, increases the storage modulus of the mixture.

Figure 9:
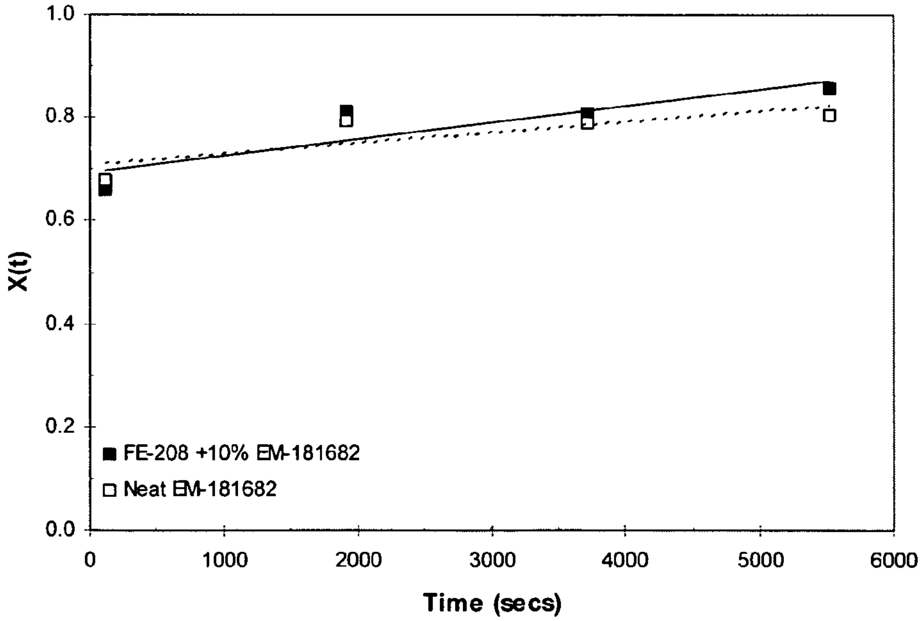
FIG. 9 illustrates a plot of re-crystallization data of rheology modifying agents and toner compositions according to embodiments of the present invention.

The recrystallization behavior of the RMA2 rheology modifying agent alone and in combination with the FE-208 toner was determined and is plotted in FIG. 9. The y-axis in FIG. 9 represents the percentage of crystallization of the compound, which is plotted against time on the x-axis. At a time of about 100 seconds, it can be seen that the re-crystallization of a toner composition comprising FE-208 toner and 10 percent by weight of an RMA2 rheology modifying agent is about 67 percent. This represents rapid re-crystallization of the toner composition.

Figure 10:
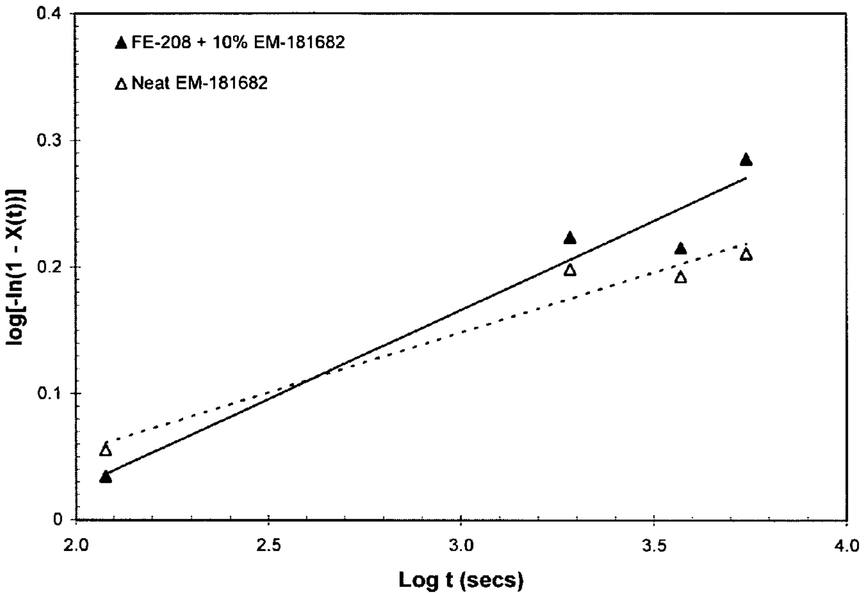
FIG. 10 illustrates a plot of re-crystallization data of rheology modifying agents and toner compositions according to embodiments of the present invention.

The re-crystallization of the toner composition comprising FE-208 toner and 10 percent by weight RMA2 rheology modifying agent was also analyzed using the Avrami equation. The results are plotted in FIG. 10. As illustrated, most of the re-crystallization is complete within a normal processing time for toners. Thus, the RMA2 rheology modifying agent will not plasticize the amorphous polyester FE-208 toner, and will avoid processing problems and poor storage stability of the toner caused by plasticization.

The toner compositions comprising a mixture of FE-208 toner and RMA2 rheology modifying agents exhibited lower melt viscosities and higher storage modulus values than that of the FE-208 toner alone. The decreased viscosities correspond to lower cold offset temperatures and the increases storage modulus values correspond to higher hot offset temperatures. As a result, the toner compositions including RMA2 rheology modifying agents exhibit a larger offset latitude range. In addition, the toner compositions comprising the FE-208 toner and RMA2 exhibited the same glass transition temperatures ($T_g$) as that of the toner FE-208 alone, which indicates that the glass transition temperature of the amorphous polyester FE-208 toner is unaffected by the presence of the crystalline RMA2 rheology modifying agent.

A comparison of the properties of the FE-208 toner with the FE-208 toner and rheology modifying agent blends of Examples 1 and 2 is shown in TABLE 2. In particular, the viscosity at 105° C. (n) and the storage modulus values (G') at 105° C. and 180° C. are shown for each toner composition. The toner compositions comprising FE-208 toner and a rheology modifying agent are designated by the amount of rheology modifying agent added to the FE-208 toner on a weight percentage basis.

TABLE 2

| | n (kP, 105° C.) | G' (Pa, 105° C.) | G' (Pa, 180° C.) |
|---|---|---|---|
| FE-208 | 79.0 | 429.6 | 3.1 |
| 5% RMA1 | 49.1 | 359.0 | 7.6 |
| 10% RMA1 | 51.3 | 436.1 | 10.2 |
| 20% RMA1 | 36.3 | 279.6 | 7.6 |
| 5% RMA2 | 59.8 | 388.9 | 4.9 |
| 10% RMA2 | 53.8 | 562.8 | 6.1 |
| 20% RMA2 | 21.3 | 142.1 | 9.1 |

Figure 11:
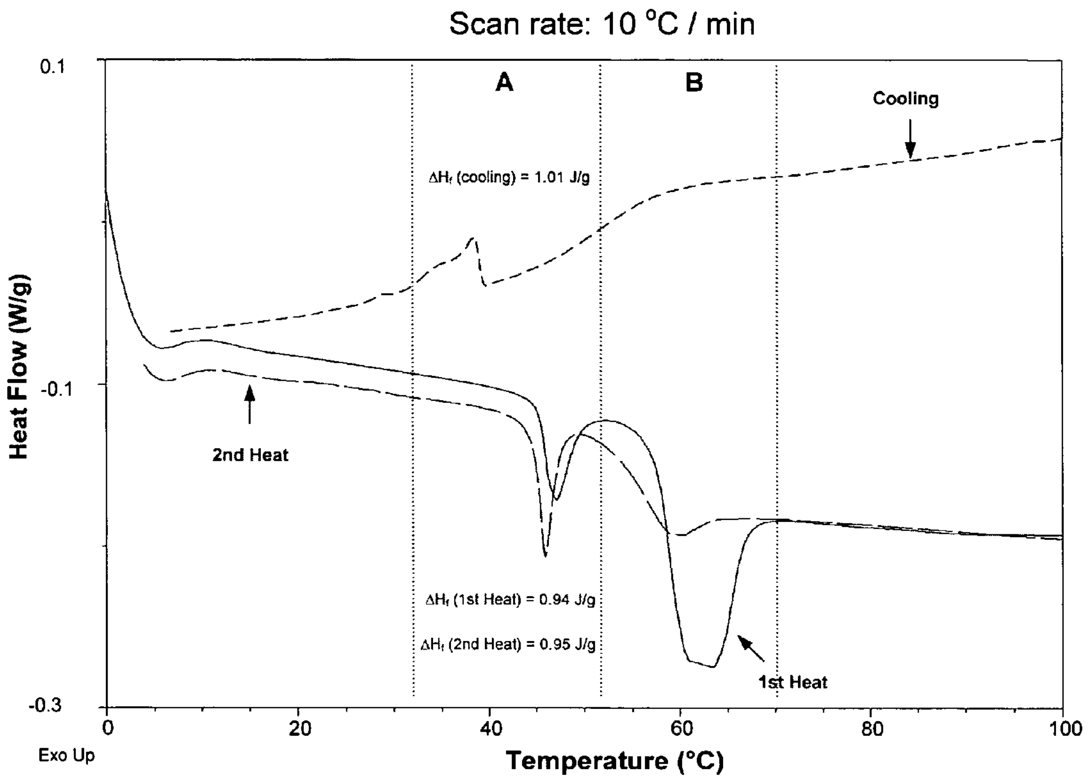
FIG. 11 illustrates a plot of melt transition data and re-crystallization data of hyperbranched rheology modifying agents according to embodiments of the present invention.

FIG. 11 illustrates a DSC characterization of the resin blends produced by Examples 1 and 2. The graph shows that the re-crystallization of the rheology modifying agent is essentially unaffected by the presence of the amorphous polyester toner (FE-208). In addition, the glass transition temperature of FE-208 toner is not decreased by the presence of the rheology modifying agent.

EXAMPLE 3

A series of carboxylic acids that can be used in the production of rheology modifying agents according to embodiments of the present invention were tested to determine relationships between the melt point of the carboxylic acids and polymers made from the carboxylic acids. The melt points were measured using a DSC instrument. The results of the melting point tests are illustrated in Table 3.

TABLE 3

| Carboxylic Acid | Melt Point of acid (° C.) | Melt Point of HBPE (° C.) |
|---|---|---|
| Myristic ($C_{14}$) | 58.1 | 18.1 |
| Palmitic ($C_{16}$) | 66.4 | 35.2 |
| Stearic ($C_{18}$) | 72.5 | 48.8 |
| Behenic ($C_{22}$) | 80.4 | 63.5 |
| Hystrene 9022 ($C_{20}/C_{22}$) | 71.4 | 60.3 |

The melt points of the pure carboxylic acids illustrate a linear relationship between the melt point of the carboxylic acid and the melt point of a polymer made using the carboxylic acid. The mixed acids (Hystrene 9022 available from Crompton Corporation, Philadelphia, Pa.) did not produce a linear relationship. The relationships determined indicate that carboxylic acids having melt points of about 58° C. or greater would be suitable for producing rheology modifying agents according to embodiments of the present invention.

EXAMPLE 4

A series of hyperbranched polymers were produced and tested to determine $T_g$ differences in the polymers. The results are shown in Tables 4 and 5.

TABLE 4

| Functionality of core | Molecular weight of core | HBPE generation | Δ Tg (° C.) (10%) |
|---|---|---|---|
| 1 | 350 | 2 | −13.4 |
| 1 | 350 | 4 | −3.6 |
| 1 | 350 | 6 | −1.8 |
| 1 | 350 | 8 | −0.9 |
| 1 | 750 | 5 | −3.1 |
| 1 | 2000 | 5 | −5.8 |
| 1 | 2000 | 6 | −3.4 |
| 1 | 5000 | 6 | −6.4 |

TABLE 4-continued

| Functionality of core | Molecular weight of core | HBPE generation | Δ Tg (° C.) (10%) |
|---|---|---|---|
| 2 | 400 | 2 | −6.7 |
| 2 | 400 | 6 | −1.2 |
| 2 | 3350 | 4 | −8.0 |
| 2 | 3350 | 6 | −2.3 |
| 3 | 134 | 3 | −1.2 |
| 3 | 134 | 4 | −1.2 |
| 3 | 134 | 5 | −1.0 |
| 3 | 134 | 6 | −1.2 |
| 3 | 270 | 5 | −1.0 |
| 3 | 990 | 5 | −1.3 |
| 3 | 3900 | 5 | −1.7 |
| 3 | 3900 | 6 | −1.2 |

TABLE 5

| Functionality of core | Molecular weight of core | HBPE generation | Δ Tg (° C.) (10%) |
|---|---|---|---|
| 1 | 350 | 3 | −6.1 |
| 1 | 350 | 4 | −2.6 |
| 1 | 350 | 5 | −1.6 |
| 1 | 350 | 6 | −1.0 |
| 1 | 750 | 3 | −10.5 |
| 1 | 750 | 4 | −5.8 |
| 1 | 750 | 5 | −3.1 |
| 1 | 750 | 6 | −1.1 |
| 2 | 300 | 3 | −1.6 |
| 2 | 300 | 4 | −0.2 |
| 2 | 300 | 5 | −0.5 |
| 2 | 300 | 6 | −0.8 |
| 2 | 1000 | 3 | −4.8 |
| 2 | 1000 | 4 | −3.2 |
| 2 | 1000 | 5 | −1.4 |
| 2 | 1000 | 6 | −1.1 |
| 3 | 270 | 3 | −0.3 |
| 3 | 270 | 4 | −0.3 |
| 3 | 270 | 5 | −1.1 |
| 3 | 270 | 6 | 0.0 |
| 3 | 990 | 3 | −2.1 |
| 3 | 990 | 4 | −1.2 |
| 3 | 990 | 5 | −1.1 |
| 3 | 990 | 6 | −1.0 |

The data in Tables 4 and 5 indicate that once the core or the generation of the hyperbranched polymer is 3 or greater, the molecular weight does not significantly affect the usability of the polymer.

In the drawings and specification, there have been disclosed embodiments of the invention and, although specific terms are employed, they are used in a generic and descriptive sense only and not for purposes of limitation. The following claims are provided to ensure that the present application meets all statutory requirements as a priority application in all jurisdictions and shall not be construed as setting forth the full scope of the present invention.

That which is claimed:

1. A composition for use in electrophotographic or printing processes, the composition comprising a resin composition suitable for such processes and a rheology modifying agent, said rheology modifying agent being a solid at room temperature and comprising a branching monomer having a total functionality of three or more, an initiator monomer having at least two hydroxyl groups, and a linear long chain aliphatic carboxylic acid reactive with said initiator monomer, said linear long chain aliphatic carboxylic acid is selected from a group consisting of tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, hepacosanoic acid, and octacosanoic acid.

2. The composition of claim 1, wherein the branching monomer is selected from the group consisting of dimethylolpropionic acid, dimethylolbutanoic acid and glycidol.

3. The composition according to claim 1, wherein the initiator monomer having two or more hydroxyl groups is selected from the group consisting of methoxy polyethylene glycol, polyethylene glycol, trimethyolpropane, ethoxylated trimethyolpropane, trifunctional polyethylene glycol, trishydroxyethyl isocyanurate, ethoxylated pentaerythritol, styrene-allyl alcohol polymers, and bisphenol/epichlorohydric oligomers and mixtures thereof.

4. A composition for use in electrophotographic or printing processes, the composition comprising a resin composition suitable for such processes and a rheology modifying agent, wherein said rheology modifying agent is a solid at room temperature and is a crystalline polymer, wherein said rheology polymer comprises a linear long chain aliphatic carboxylic acid selected from a group consisting of tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, hepacosanoic acid, and octacosanoic acid.

5. The composition according to claim 4, wherein the rheology modifying agent further comprises a branching monomer having a total functionality of three or more and initiator monomer having at least two hydroxyl groups.

6. The composition according to claim 4, wherein the initiator monomer having two or more hydroxyl groups is selected from the group consisting of methoxy polyethylene glycol, polyethylene glycol, trimethyolpropane, ethoxylated trimethyolpropane, trifunctional polyethylene glycol, trishydroxyethyl isocyanurate, ethoxylated pentaerythritol, styrene-allyl alcohol polymers, and bisphenol/epichlorohydric oligomers and mixtures thereof.

7. A composition for use in electrophotographic or printing processes, the composition comprising a resin composition suitable for such processes and a rheology modifying agent, said rheology modifying agent, said rheology modifying agent being a solid at room temperature and comprising a backbone monomer having more than one pendant epoxy group and a linear long chain aliphatic carboxylic acid reactive with the pendant epoxy groups, and selected from the group consisting of tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, hepacosanoic acid, and octacosanoic acid.

8. The composition according to claim 7, wherein the backbone monomer having more than one pendant epoxy group is selected from the group consisting of an epoxy creosol novolac resin, epoxidized phenol novolacs, styrene-allyl alcohols, addition polymers containing glycidyl methacrylate and/or allyl glycidyl ether monomer, and mixtures and blends thereof.

* * * * *